United States Patent [19]  
Künstle et al.

[11] 3,759,988  
[45] Sept. 18, 1973

[54] PROCESS FOR CONTINUOUSLY PRODUCING SORBIC ACID BY CONVERTING KETENE WITH CROTONALDEHYDE

[75] Inventors: Gerhard Künstle; Hellmuth Spes, both of Burghausen-Obb., Germany

[73] Assignee: Wacker-Chemie G. m.b.H., Munich, Germany

[22] Filed: Mar. 13, 1970

[21] Appl. No.: 19,206

[30] Foreign Application Priority Data  
Mar. 14, 1969 Germany .................. P 19 13 097.3  
May 23, 1969 Germany .................. P 19 26 538.4

[52] U.S. Cl. .................................................. 260/526 N
[51] Int. Cl. ................................................... C07c 51/00
[58] Field of Search ................................. 260/526 N

[56] References Cited  
UNITED STATES PATENTS  
3,021,365 2/1962 Fernholz et al. ................. 260/526 N  
3,056,830 8/1962 Koopal et al. .................... 260/526 N  
3,461,158 8/1969 Hornig ............................. 260/526 N

*Primary Examiner*—Vivian Garner  
*Attorney*—Donald Malcolm

[57] ABSTRACT

Process for continuously producing sorbic acid by converting ketene with crotonaldehyde in the presence of catalysts, and converting the produced polyester into sorbic acid by saponification. In performing the process we convert ketene with crotonaldehyde containing 0.01 to 1% of a sterically hindered phenol as a stabilizer against oxidation, in the presence of tetraalkyl titanates or their condensation products and of a co-catalyst containing one or several compounds, at temperatures from 60° to 102° C, preferably 70° – 90° C, and we convert the resulting polyester containing the catalyst and co-catalyst, and freed from crotonaldehyde, into sorbic acid by acid hydrolysis, by, a. using for saponification a 20.2 to 25 percent hydrochloric acid, subsequently
b. reheating the hydrolysis mixture, consisting of raw sorbic acid and hydrochloric acid, for about 1 to 5 hours to a temperature from 70° and 90° C, and after cooling we separate it in the known manner into raw sorbic acid and hydrochloric acid, and the hydrochloric acid is recirculated without purification,
c. removing the hydrogen chloride still present in the raw sorbic acid in the form of hydrochloric acid after separation — by washing with water down to a residue of about 0.2 to 0.5 percent, and neutralizing it in part or entirely.

10 Claims, 1 Drawing Figure

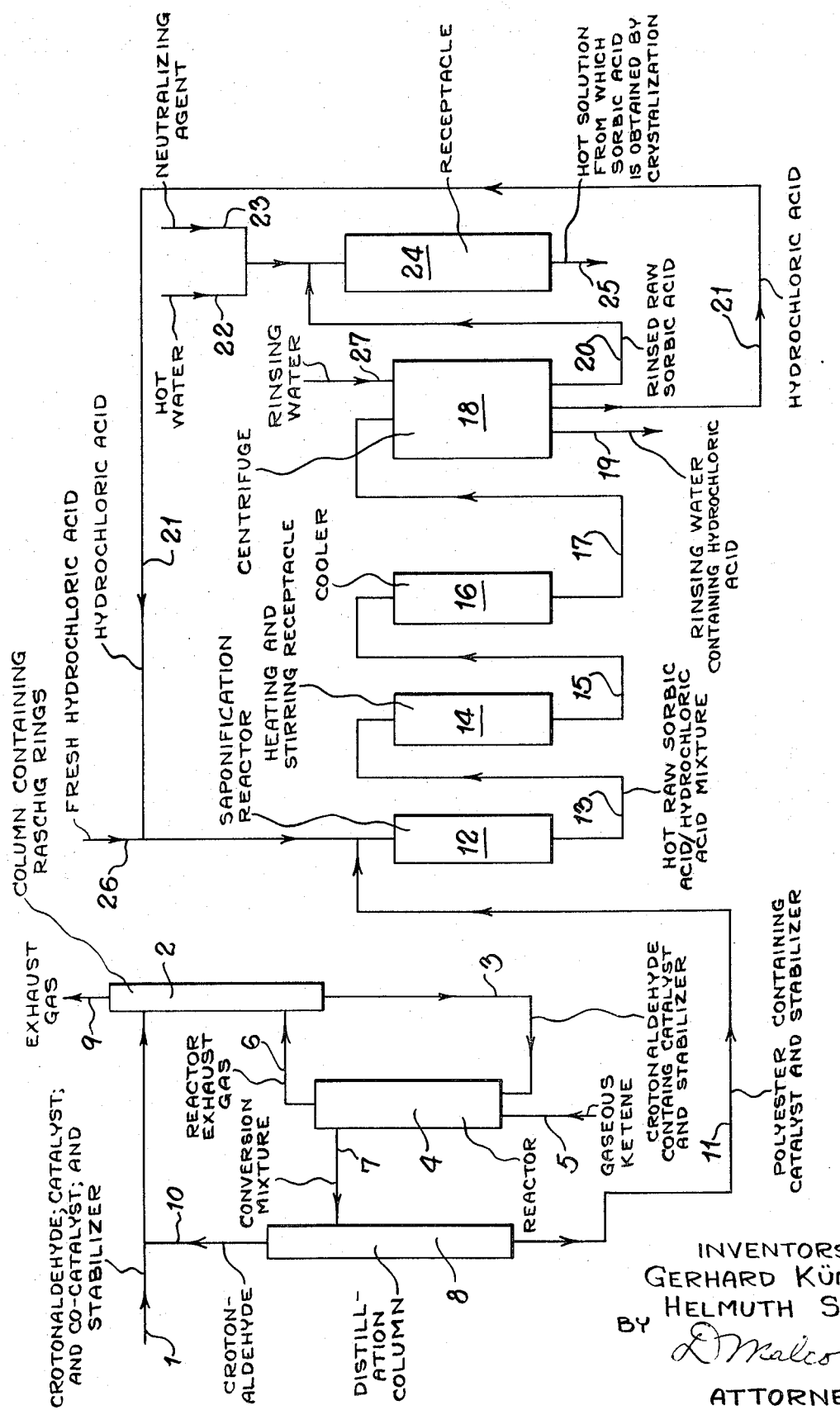

PROCESS FOR CONTINUOUSLY PRODUCING SORBIC ACID BY CONVERTING KETENE WITH CROTONALDEHYDE

BACKGROUND OF THE INVENTION

Sorbic acid can be produced from ketene and crotonaldehyde by way of a polyester in various ways. There are differences in the kind of catalysts used in the production of the polyester as well as in its processing into sorbic acid.

As catalysts one uses either acid compounds at temperatures below 25° C, e.g. boron trifluoride, mercury halide, zinc chloride or zinc nitrate (see U.S. Pat. Nos. 2,484,067, 2,450,134, 2,469,690 and 2,450,118) or neutral compounds at conversion temperatures of 25° - 60° C, for instance carboxylic acid salts of bivalent metals of the II to VIII sub-group of the periodic System, particularly zinc salts (see U.S. Pat. No. 2,466,420; application Ser. No. 252,194, published in the Official Gazette , Vol. 673, 1953, page 839; German specification No. 1,042,573 and Italian Pat. No. 643,282).

The conversion of the polyester into sorbic acid is possible by thermal cracking in the presence of acid or alkaline additives (see the above-mentioned U.S. application Ser. No. 252,194, German specification Nos. 1,049,852, 1,059,899, 1,064,054 and 1,153,742), as well as by saponification. In the case of the latter, the polyester is transformed into sorbic acid either directly by the action of a strong mineral acid or by treatment with alkali and subsequent acid dehydration through alkali salt (see U.S. Pat. No. 2,484,067; German specification Nos. 1,244,162 and 1,042,573). There, high sorbic acid yields can be obtained only if a processing method is used that is adapted to the catalyst used during the conversion of ketene with crotonaldehyde. For instance, a polyester which has been prepared in the presence of soluble fatty acid zinc salts cannot be transformed into sorbic acid, or can be transformed only slightly, by treatment with strong mineral acids. However, a better yield is achieved by thermal cracking (distilling) or by alkaline saponification with subsequent acid water separation (see German specification No. 1,042,573). But if an acid catalyst like boron trifluoride or a zinc salt of a lower aliphatic carboxylic acid, for instance zinc acetate, is used for producing the polyester, and the acid saponification leads to high, the alkaline saponification to low,yields (U.S. Pat. No. 2,484,067 and German specification No. 1,244,162).

If one uses acid catalysts for producing the polyester,difficulties arise which require an expensive and additional processing technique and it is not possible to prevent the side reactions caused by crotonaldehyde even by using safety measures, like keeping low reaction temperatures or the use of large quantities of reaction-inert solvents.

Side reactions of crotonaldehyde can be largely avoided by neutral catalysts, it is true. But other, just as weighty disadvantages remain. For instance, the metal salt catalysts represent hardly soluble or insoluble solids which can be successfully used only within a temperature range between 25° and 60° C (see German specification No. 1,150,671). However, at higher conversion temperatures lower and lower yields are obtained.

During the conversion of ketene with crotonaldehyde high reaction temperatures are desirable. By this,high volume-time yields are achieved and the high toughness of the polyester, existing at low reaction temperatures, is avoided. Also a high excess of crotonaldehyde and an addition of reaction-inert solvents becomes unnecessary. This working method has the result that the further processing of the polyester into sorbic acid requires lower distilling expense and the reaction heat at higher reaction temperature can be removed in a technically simple way.

If one uses the tetraalkyl titanates as catalysts, the described difficulties can be avoided and the advantages of high conversion temperatures can be utilized. However, a polyester produced in this manner can be converted into sorbic acid with a high yield by acid hydrolysis, e.g. with hydrochloric acid, only if the conversion if ketene with crotonaldehyde occurs at temperatures lower than 70° C.

SUMMARY OF THE INVENTION

We have now discovered a process for the continuous production of sorbic acid by the conversion of ketene with preferably stoichiometrically excess crotonaldehyde, in the presence of catalysts, and the conversion of the produced polyester into sorbic acid by saponification. The process is characterized by the fact that we convert ketene with crotonaldehyde, containing 0.01 to 1 percent of a sterically hindered phenol as a stabilizer against oxidation, in the presence of tetraalkyl titanates or their condensation products and of a co-catalyst consisting of one or several acid compounds, at temperatures from 60° to 102° C, preferably 70° - 90° C, and we convert the resulting polyester containing the catalyst and co-catalyst, and freed from crotonaldehyde, into sorbic acid by acid hydrolysis, by a. using for saponification a 20.2 to 25 percent hydrochloric acid, subsequently
b. reheating the hydrolysis mixture, consisting of raw sorbic acid and hydrochloric acid, about 1 to 5 hours to temperatures from 70° to 90° C, and after cooling we separate it in the known manner into raw sorbic acid and hydrochloric acid, and the hydrochloric acid is recirculated without purification,
c. removing the hydrogen chloride still present in the raw sorbic acid in the form of hydrochloric acid after separation — by washing with water down to a residue of about 0.2 to 0.5 percent, and neutralizing it in part or entirely.

DESCRIPTION OF THE PREFERRED EMBODIMENTS

Suitable tetraalkyl titanates are those whose alkyl groups are straight-chained or branch-chained and contain two to 18 carbon atoms, e.g. tetraethyl titanate, tetra-n-propyl titanate, tetra-iso-propyl titanate, tetra-n-butyl titanate, tetra-iso-butyl titanate, tetra-n-hexyl titanate, tetra-iso-octyl titanate and tetrastearyl titanate. However, condensed tetraalkyl titanates like poly-dipropyl titanate or poly-dibutyl titanate can be used successfully (see Houben-Weyl, Methoden der Org. Chemie, Sauerstoffverbindungen I, Vol. 6, Part 2, 1963, pp. 23 - 24).

It is sufficient there to dosage the tetraalkyl titanates in quantities of 0.1 to 1 weight percent, referred to the crotonaldehyde used.

Suitable as co-catalysts which are preferably added in a quantity of 0.05 weight percent at the most, referred to the crotonaldehyde used, singly or in mixture, — are all acid compounds, preferably mineral acids, mineral acid salts of metals of the II to VIII sub-group of the Periodic System, hydrogen halide or Friedel-Crafts catalysts, e.g. hydrochloric acid hydrofluoric acid, phosphoric acid, sulphuric acid, monofluophosphoric acid $H_2PO_3F$, difluophosphoric acid $HPO_2F_2$, hexafluophosphoric acid $HPF_6$, fluoboric acid $HBF_4$, boric acid, fluosilicic acid $H_2SiF_6$, hexafluorantimonic acid $HSbF_6$, zinc-, cadmium- and mercury fluoride, - chloride and bromide, fluorine, chlorine, bromine and hydrogen iodide, boron trifluoride, titanium tetrafluoride, titanium trifluoride, antimony pentafluoride and aluminum chloride.

The co-catalysts, e.g. compounds of the type of boron trifluoride or zinc chloride are used to advantage in the form of etherates or alcoholates in etheric or alcoholic solution. They may be used singly or in mixture. However, a co-catalyst concentration of 0.05 weight percent, referred to the crotonaldehyde used, with sometimes different quantity proportions of several different co-catalysts to each other, should not be exceeded.

The quantity proportion of tetraalkyl titanate : cocatalyst : crotonaldehyde may vary within the limits of the invention. Here different catalyst mixtures may give the same results.

Optimum catalyst mixtures can be determined by preliminary tests. The effect of the former depends on their composition, the reaction temperature and the differing activity strength of the co-catalyst.

The reaction temperature may be 60° – 102° C. However, preferably the conversion is carried out at 70° – 90° C. Within this temperature range it is sufficient to dosage the crotonaldehyde with an excess of 35 percent of theoretical at the most in order to achieve a good conversion of the ketene and keep the viscosity of the reaction product low.

Moreover, it is advantageous to use the crotonaldehyde in a form as feee of water as possible. However, generally the technical crotonaldehyde is sufficient, after it has been largely freed of water by distilling.

Before conversion, the crotonaldehyde is compounded with small quantities of a sterically hindered phenol, like 2.5-di-tertiary-butyl-p-cresol, which hinders the formation of crotonic acid in a special manner. But other sterically hindered phenols can also be used for stabilizing the crotonaldehyde against oxidation. Phenols of the following general structure should be mentioned:

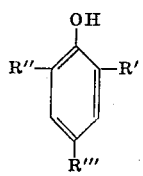

where R' and R'' represent tertiary butyl, iso-propyl, cyclo-hexyl groups, and R''' hydrogen, an alkyl, hydroxyalkyl, carboxyl or carboxy-alkyl group, e.g. 3.5-di-tertiary-butyl-4-hydroxybenzyl alcohol or 3.5-di-tertiary-butyl-4-hydroxybenzoic acid. Quantities of 0.01 to 1 weight percent, referred to the crotonaldehyde used, are useful.

Ketene can be used in technically pure form (about 90 percent pure). However, particularly suitable is a ketene which is obtained in accordance with the description of German patent No. 1,079,623 or of German specification No. 1,203,248.

The duration of the subsequent heating as well as the temperature are inversely proportional to the hydrolysis temperature and staying time as well as the concentration of the hydrochloric acid used. Optimum reaction conditions which result, depending on the kind of apparatus used, in various ways by changing the above values before saponification as also during subsequent heating, may be determined by preliminary tests.

It is useful to use sufficient quantities of hydrochloric acid during saponification, so as to be able to carry out the subsequent heating with good mixing of the reaction mixture.

It is advantageous to use the hydrochloric acid in diluted form, preferably as a 20.2 to 25 percent aqueous solution.

The rinsing of the raw sorbic acid, moist with hydrochloric acid, with water is preferably carried out with the apparatus used for separating the hydrochloric acid/raw sorbic acid mixture, e.g. the centrifuge. It has been found useful to add the rinsing water in portions.

In order to obtain a good quality and yield of sorbic acid, it is useful to remove the hydrochloric acid only in part by rinsing with water, and then to neutralize the balance in part or in its entirety. Suitable neutralizing agents are compounds which react with hydrochloric acid while forming chlorides, e.g. basic reacting alkali- or alkaline earth compounds, ammonia, amines. The neutralizing agent may also be used in a slightly reduced charge which amounts, for instance, to 99 – 99.9 percent of the theoretical.

It is helpful to connect the neutralization with the purification of the raw sorbic acid by crystallization, by dissolving, for instance, the raw sorbic acid containing hydrochloric acid — in hot water, compounding the solution with the neutralizing agent and obtaining therefrom the pure sorbic acid in the known manner.

The invention is described in connection with the accompanying drawing which is a diagrammatic illustration of a system for carrying out the process.

In the drawing, gaseous ketene is piped into the lower part of the reactor 4 through pipeline 5, and at the same time the crotonaldehyde containing the catalyst and stabilizer is piped in from below through line 3. The residual gas escaping through the exhaust pipe 6, which can still contain small quantities of ketene and crotonaldehyde, is carried toward the crotonaldehyde containing the catalyst and stabilizer (the crotonaldehyde being piped into column 2 through line 1) - in a column 2 which is connected after reactor 4 and is filled with Raschig rings. While an exhaust gas which is practically free of crotonaldehyde and ketone escapes on top of column 2 through line 9, the runoff of the crotonaldehyde containing the catalyst and stabilizer is carried through the line 3 of column 2 into the lower end of reactor 4. The staying time, which may vary within wide limits, is set by the overflow 7 at the upper end of reactor 4.

The polyester which was formed at the overflow 7 of the reactor 4 is, for instance, being distilled continuously in a thin-layer distillation column 8 in a vacuum, whereupon the excess crotonaldehyde can be recovered in practically pure form and recirculated.

The polyester which is free of crotonaldehyde and contains catalyst and stabilizer is carried hot (about 70° C) through line 11 into the saponification reactor 12. At the same time a 25 percent hydrochloric acid is piped in from the circuit 21. The weight proportion of hydrochloric acid to polyester is 3 : 1. At the staying time of 1 hour and a reaction temperature of 80° C the polyester/hydrochloric acid mixture, which is homogeneous at first, is stirred, at which time sorbic acid is being formed. The hot raw sorbic acid/hydrochloric acid mixture is subsequently piped through the line 13 into the staying receptacle 14 and there under thorough stirring for 3 hours it is heated again to 80° to 85° C. Thereafter the reaction mixture is piped through line 15 into the cooler 16, cooled and carried into the centrifuge 18 through line 17. While hydrochloric acid is obtained through line 21, which is again piped into the saponification reactor 12 (hydrochloric acid circulation), and while the hydrochloric acid which remains in the raw sorbic acid as a residual moisture is replenished by fresh 25 percent hydrochloric acid through line 26, the raw sorbic acid which is moist with hydrochloric acid, before removal from the centrifuge, is rinsed three times with 0.6 weight parts of cold water per weight part of raw sorbic acid each time. The rinsing water is piped in through line 27. While the rinsing water containing the hydrochloric acid escapes through line 19, the rinsed raw sorbic acid which still contains about 0.25 percent of hydrochloric acid is piped through line 20 into the container 24. At the same time one pipes into the same container, through line 22, 46.6 weight parts of hot water per weight part of raw sorbic acid, and through line 23 — the neutralizing agent. While stirring, the mixture is heated to 98° C. From the hot solution obtained through line 25 the sorbic acid is obtained by crystallization in the known manner.

Since the purification of the circulating hydrochloric acid is eliminated, the process of the invention requires less apparatus and a lower heat consumption. Also, by comparison, the loss of hydrochloric acid is slight. The removal of the hydrochloric acid from the raw sorbic acid which occurs by rinsing and neutralization, results in connection with the hydrochloric acid circulation in lower losses of sorbic acid during processing of the polyester into sorbic acid.

It is surprising that the conversion of ketene with crotonaldehyde in the presence of tetraalkyl titanate as a catalyst can be improved by adding small quantities of an acid co-catalyst in spite of high conversion temperatures, Side reactions of the crotonaldehyde are not favored thereby, but are largely eliminated. The yield of sorbic acid is thereby increased, referred not only to the converted ketene, but also referred to the converted crotonaldehyde.

The catalyst in accordance with the process of the invention enables one to work at reaction temperatures higher than those used heretofore, which makes the use of solvents unnecessary and largely simplifies the processing of polyester into sorbic acid.

Moreover, a comparatively small quantity of cocatalyst effects a considerable saving of tetraalkyl titanate, which reduces the total quantity of catalyst.

Another advantage lies in the fact that the catalyst mixtures of the invention are predominantly liquids, which are particularly suitable for carrying out the process continuously.

Finally, the tie-in between the preparation of polyester at high reaction temperatures and the direct conversion of the polyester by acid hydrolysis in the presence of mineral acids, which is possible according to the invented process with improvement of the sorbic acid yield — represents a considerable technical advance.

Moreover, surprisingly from a chloride, containing sorbic acid solution one obtains a less colored sorbic acid, which is more stable and has better flowing and spraying properties.

Last but not least, one can obtain high volume-time yields which amount to > 2 volume portion of reaction mixture per hour per portion of volume. It is significant that according to the process of the invention no important quantities of by-products of ketene, like diketene, are formed. It is not necessary to re-heat the polyester before processing it further in order to render any by-products which impair the degree of purity of the sorbic acid, ineffective (see German specification No. 1,150,672).

EXAMPLE 1

191.0 weight parts of a mixture, consisting of 1.89 weight parts tetra-n-butyl titanate, 0.0095 weight parts hexafluorphosphoric acid and 189 weight parts crotonaldehyde containing 0.1 weight parts of 2.6-di-tertiary-butyl-p-cresol, are piped in per hour at the top end of column 2 (supplied with Raschig rings) through line 1. The runoff obtained at the bottom end of column 2 is piped continuously through line 3 from below into reactor 4 which at the same time is supplied with 84 weight parts ketene piped in per hour through line 5. The reaction temperature is kept at 80° C. While the reactor exhaust gas escaping through line 6 is piped into the lower part of the Raschig ring column 2, the continuously obtained conversion mixture is piped through the overflow 7 into the distillation column 8 working at 20 Torr. The reactor exhaust gas obtained through line 9 is practically free of ketene and crotonaldehyde. While through line 10 an hourly quantity of 36 weight parts of crotonaldehyde is obtained, through line 11 one obtains per hour 238.5 weight parts of a raw, crotonaldehyde-free, polyester containing catalyst and stabilizer, which is piped hot (about 70° C) into the saponification reactor 12 which is equipped with a stirring mechanism and a jacket heater.

At the same time 715.5 weight parts of a 25 percent hydrochloric acid are piped per hour into the saponification reactor 12 through line 21; of these 693 weight parts are in circulation, and 22.5 weight parts are being replaced per hour through line 26 in the form of 25 percent hydrochloric acid. The staying time of the mixture in saponification reactor 12 is 1 hour, the reaction temperature 80° C. Subsequently the hot saponification mixture is piped into receptacle 14 which is likewise equipped with a stirring mechanism and a jacket heater — through line 13, in which receptacle 14 the reaction mixture is re-heated for 3 hours to 80° – 85° C. Thereafter the mixture is continuously piped through line 15 into cooler 16 and there it is cooled to 18° C. Afterward it is carried through line 17 into a peeling centrifuge unit 18 and separated into hydrochloric acid and raw sorbic acid. The raw sorbic acid, moist with hydrochloric acid, is rinsed with water which is piped in through line 27 and the rinsed raw sorbic acid which still contains hydrochloric acid is carried out by peeling. All work steps in the centrifuge are performed in cadence. The hydrochloric acid obtained through line 21 is returned into the reactor 12 (hydrochloric acid circulation).

The raw sorbic acid, moist with hydrochloric acid, is rinsed three times with 155 weight parts of water (18°C) each time. The rinsing water, containing hydrochloric acid, is removed through line 19. Through line 20 one obtains per hour 262.3 weight parts of rinsed raw sorbic acid which still contain about 0.25 percent of hydrochloric acid in the form of 2.7 percent hydrochloric acid, and is piped into the container 23 equipped with a stirring mechanism and a jacket heater. Into the same container one pipes through line 22 per hour 10,250 weight parts hot water, and 2.11 weight parts caustic potash in the form of a concentrated aqueous solution through line 23. The temperature is 98° C. From the hot solution obtained through line 25 which besides raw sorbic acid and small quantities of potassium chloride contains resin-like impurities, one obtains by crystallization per hour 208 weight parts of pure sorbic acid, corresponding to a yield of 92.8 percent referred to ketene, and 85 percent referred to croton aldehyde.

The same result is obtained if instead of hexafluorphosphoric acid one uses 0.01 weight parts of difluorphosphoric acid and if the crotonaldehyde contains instead of 0.1 weight percent 2.6-di-tertiary-butyl-p-cresol, 0.2 weight percent 3.5-di-tertiary-butyl-4-hydroxybenzyl alcohol or 0.3 weight percent 3.5-di-tertiary-butyl-4-hydroxybenzoic acid.

EXAMPLES 2 to 16

If one proceeds as in Example 1, but using a different catalyst mixture and/or other reaction temperatures when preparing the polyester, one achieves the following yields of pure sorbic acid from the polyester which was formed per hour containing catalyst and free of crotonaldehyde:

| Ex. No. | Catalyst | Quantity* | Co-catalyst |
|---|---|---|---|
| 2 | tetra-n-butyl titanate | 0.8 | hydrochloric acid |
| 3 | tetra-iso-butyl titanate | 0.7 | titan. tetrafluoride |
| 4 | tetra-n-butyl titanate | 1.0 | ZnCl₂ (as etherate) |
| 5 | tetra-2-methylpropyl titanate | 1.0 | hydrogen fluoride |
| 6 | tetra-n-butyl titanate | 0.9 | Sb pentafluoride ZnCl₂ (as etherate) |
| 7 | tetra-n-butyl titanate | 1.0 | ZnCl₂ (as etherate) |
| 8 | tetra-n-butyl titanate | 0.5 | concen. H₃PO₄ |
| 9 | tetra-stearyl titanate | 1.0 | aluminum chloride |
| 10 | tetra-i-propyl titanate | 1.0 | bor. trifluoride (as etherate) |
| 11 | tetraethyl titanate | 1.0 | mercuric bromide |
| 12 | tetra-n-hexyl titanate | 1.0 | CdCl₂ (as etherate) |
| 13 | tetra-n-butyl titanate | 1.0 | cobalt sulfate |
| 14 | condensed tetra-2-methyl propyl titanate with titanium content about 18.9% | 1.0 | zinc fluoride as etherate, fluoboric acid |
| 15 | polydibutyl titanate with (titanium content about 20.3% | 1.0 | monofluorphosphoric acid |
| 16 | polydibutyl titanate with (titanium content about 22.5%) | 1.0 | boric acid |

* in % referred to the crotonaldehyde used

| Quantity* | React. temp. in °C | Yield of pure sorbic acid in % | |
|---|---|---|---|
| | | referred to ketene | referred to crot. aldehy. |
| 0.01 | 85 | 94.5 | 80.0 |
| 0.05 | 90 | 92.0 | 79.2 |
| 0.05 | 70 | 91.0 | 84.2 |
| 0.005 | 85 | 90.8 | 81.5 |
| 0.005 | 80 | 90.6 | 81.0 |
| 0.02 | | | |
| 0.05 | 80 | 89.5 | 81.5 |
| 0.05 | 80 | 89.3 | 77.8 |
| 0.05 | 80 | 87.2 | 77.5 |
| 0.02 | 80 | 87.0 | 82.3 |
| 0.05 | 90 | 86.0 | 76.7 |
| 0.04 | 85 | 84.5 | 76.5 |
| 0.05 | 90 | 84.2 | 76.3 |
| 0.04 | 75 | 81.7 | 74.4 |
| 0.001 | | | |
| 0.03 | 75 | 80.2 | 70.3 |
| 0.05 | 85 | 70.5 | 67.5 |

* in % referred to the crotonaldehyde used

EXAMPLES 17 to 21 (COMPARATIVE EXAMPLES

If one proceeds as in Example 1, but excluding the tetraalkyl titanates and their condensation products during the preparation of the polyester, the yield of sorbic acid is:

| Ex. No. | Catalyst | Cat.-conc. ref. to crotonaldehyde used | Yield of pure sorbic acid in % ref. to ketene |
|---|---|---|---|
| 17 | ZnCl₂ as etherate | 0.1 | 67.9 |
| 18 | ZnCl₂ as etherate | 3.0 | 54.8 |
| 19 | hexafluorphosphoric acid | 0.1 | 44.6 |
| 20 | hexafluorphosphoric acid | 0.5 | 31.0 |
| 21 | boron trifluoride as etherate | 1.0 | 34.5 |

The invention claimed is:

1. Process for continuously producing sorbic acid by converting ketene with crotonaldehyde in the presence of calalysts and converting the polyester of sorbic acid thus formed by hydrolysis into sorbic acid, comprising the steps of:

a. reacting ketene with crotonaldehyde containing from about 0.01 to about 1 percent by weight of a sterically hindered phenol of the formula:

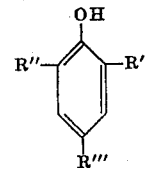

wherein R' and R'' are selected from the group consisting of tertiary butyl, isopropyl and cyclohexyl, and R''' is selected from the group consisting of hydrogen, alkyl, hydroxyalkyl, carboxyl and carboxyalkyl, as a stabilizer against oxidation, in the presence of a catalytically effective amount of a tetra-alkyl titanate catalyst, the alkyl having from two to 18 carbon atoms, and a co-catalyst selected from the group consisting of a mineral acid, and a Friedel-Crafts catalyst, at a temperature between about 60° and about 102°C., to form a polyester of sorbic acid;

b. hydrolyzing said polyester by treatment with 20.2 to 25 percent weight concentration hydrochloric acid, to form sorbic acid;

c. heating the hydrolysis mixture obtained in step (b) for a period of 1 to 5 hours at a temperature of about 70° to 90°C., cooling the mixture, separating the crude sorbic acid from the hydrochloric acid, and recycling the hydrochloric acid to the hydrolysis step;

d. removing hydrochloric acid impurities still remaining in the sorbic acid by rinsing with water to a residual content of about 0.2 to 0.5 percent by weight, and neutralizing said residual by hydrochlorine acid content with an alkaline neutralizing agent.

2. The process of claim 1 in which the amount of tetraalkyl titanate catalyst is between about 0.1 and 1 percent by weight, based upon the crotonaldehyde, and the alkyl is a straight-chain alkyl.

3. The process of claim 1 in which the amount of tetraalkyl titanate catalyst is between about 0.1 and 1 percent by weight, based upon the crotonaldehyde, and the alkyl is branched-chain alkyl.

4. The process of claim 1 in which the amount of co-catalyst is at most about 0.05 percent by weight, based upon the crotonaldehyde.

5. The process of claim 1 in which said co-catalysts are etherates or alcoholates of Friedel-Crafts catalysts in ether or alcoholic solution.

6. Process according to claim 1, in which the crotonaldehyde is used in an excess of at the most 35% of the theoretical.

7. Process according to claim 1, in which the neutralization is performed during purification of the raw sorbic acid by crystallization from water.

8. Process according to claim 1, in which the neutralizing agent is a compound which reacts with hydrochloric acid to form a chloride.

9. The process of claim 1 in which the neutralizing agent is used in an amount of about 99.5 to 99.9 percent of the theoretical calculated on the residual hydrochloric acid.

10. Process as claimed in claim 1, in which the said co-catalyst is selected from the group consisting of hydrochloric acid, hydrofluoric acid, phosphoric acid, sulphuric acid, monofluophosphoric acid $H_2PO_3F$, difluophosphoric acid $HPO_2F_2$, hexafluophosphoric acid $HPF_6$, fluoboric acid $HBF_4$, boric acid, fluosilicic acid $H_2SiF_6$, hexafluorantimonic acid $HSbF_6$, zinc-, cadmium- and mercury fluoride, -chloride, and -bromide, fluorine-, chlorine-, bromine- and hydrogen iodide, boron trifluoride, titanium tetrafluoride, titanium trifluoride, antimony pentafluoride and aluinum chloride.

* * * * *